United States Patent
Save et al.

(10) Patent No.: US 11,425,539 B2
(45) Date of Patent: Aug. 23, 2022

(54) METHOD FOR NEXTGEN MISSION CRITICAL NETWORKS TO DETERMINE LOCATION OF TETRA NETWORK DEVICES

(71) Applicant: Tata Consultancy Services Limited, Mumbai (IN)

(72) Inventors: Abhijit Shaileshchandra Save, Mumbai (IN); Mayur Gajanan Thakur, Mumbai (IN); Benfy Anto, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 139 days.

(21) Appl. No.: 17/118,138

(22) Filed: Dec. 10, 2020

(65) Prior Publication Data

US 2021/0219107 A1    Jul. 15, 2021

(30) Foreign Application Priority Data

Dec. 12, 2019    (IN) .............................. 201921051621

(51) Int. Cl.
*H04W 4/00*    (2018.01)
*H04W 4/10*    (2009.01)
(Continued)

(52) U.S. Cl.
CPC ........... *H04W 4/10* (2013.01); *H04L 65/1104* (2022.05); *H04W 4/08* (2013.01); *H04W 4/90* (2018.02); *H04W 76/45* (2018.02); *H04W 84/08* (2013.01)

(58) Field of Classification Search
CPC ........ H04W 4/02; H04W 4/029; H04W 64/00
See application file for complete search history.

(56) References Cited

U.S. PATENT DOCUMENTS

2007/0155416 A1\* 7/2007 Donnellan .............. H04W 4/00
                                                                  455/518
2015/0031324 A1    9/2015 Zentner et al.
(Continued)

FOREIGN PATENT DOCUMENTS

WO    WO2013038154 A1    3/2013
WO    WO2018037235 A1    3/2018

*Primary Examiner* — Omoniyi Obayanju
(74) *Attorney, Agent, or Firm* — Finnegan, Henderson, Farabow, Garrett & Dunner LLP

(57) ABSTRACT

Applications such as interworking between mission critical push-to-talk (MCPTT) and terrestrial trunked radio (TETRA) networks is not feasible due to absence of vendor-independent protocol for location information exchange between the MCPTT and TETRA networks. The disclosure herein generally relates to telecommunication networks, and, more particularly, to a method and a network for location information exchange between the MCPTT and TETRA networks. Protocols are defined for facilitating location information exchange between a MCPTT server and a TETRA location server, for various triggers including Periodic, CellChange, Immediate Request, PowerOn, and EnterService. In the event of any of these triggers, an Interworking Module (IM) situated between the MCPTT server and the TETRA location server performs mapping between Session Initiation Protocol (SIP) messages from the MCPTT and Location Information Protocol (LIP) messages from the TETRA location server to facilitate the location information exchange between the MCPTT server and the TETRA location server.

16 Claims, 4 Drawing Sheets

(51) Int. Cl.
*H04W 4/90* (2018.01)
*H04W 76/45* (2018.01)
*H04W 4/08* (2009.01)
*H04L 65/1104* (2022.01)
*H04W 84/08* (2009.01)

(56) References Cited

U.S. PATENT DOCUMENTS

2018/0315063 A1 11/2018 Cheesman
2019/0281506 A1* 9/2019 Chiang ................. H04W 76/19

* cited by examiner

METHOD FOR NEXTGEN MISSION CRITICAL NETWORKS TO DETERMINE LOCATION OF TETRA NETWORK DEVICES

PRIORITY CLAIM

This U.S. patent application claims priority under 35 U.S.C. § 119 to: India Application No. 201921051621, filed on Dec. 12, 2019. The entire contents of the aforementioned application are incorporated herein by reference.

TECHNICAL FIELD

The disclosure herein generally relates to telecommunication networks, and, more particularly, to a method for NextGen mission critical networks to determine location of tetra network devices.

BACKGROUND

Land Mobile Radio (LMR) systems provide reliable, secure and highly available "mission critical" secure voice and low bandwidth data communications based on instant push-to-talk (PTT) technology. Terrestrial Trunked Radio (TETRA), which is LMR technology widely used in narrowband communication. From various application perspective, low bandwidth support of TETRA is considered as a limitation.

The 3rd Generation Partnership Project (3GPP) defines standardization of broadband wireless technologies such as 4G and 5G. Key enablers or features of these technology are higher spectrum efficiency and high data rates. The 3GPP has created Mission Critical Broadband and the relevant mission critical features are being enhanced as specific use-cases for critical applications. Mission Critical Push-To-Talk (MCPTT) is one such technology.

The inventors here have recognized several technical problems with such conventional systems, as explained below. As LMR networks deployment have significant installed base and 4G 5G technologies are still evolving, there will be significant duration during which both the technologies will have to co-exist. This would need interworking between these two technologies with interoperable solutions to facilitate communications across technologies. Unexpected incidents or critical situations need users of 3GPP technology to involve TETRA users to form a hybrid group to initiate Push-To-Talk communications. However, for the interworking between the MCPTT and TETRA to work, location information for all members/devices associated with TETRA is needed by a MCPTT server, which allows the MCPTT server to have better situational awareness and enable requisite location based features.

However, 3GPP MCPTT and TETRA are based on different technologies. As per 3GPP standards, MCPTT is based on IP protocol (mainly SIP) while TETRA as per ETSI standards is based on ISI (QSIG based) protocol. Due to absence of a vendor-independent protocol for communication between the MCPTT and TETRA, in current interworking scenario, location information of the TETRA Mobile Stations (MS) is not shared with the MCPTT server by a TETRA location server.

SUMMARY

Embodiments of the present disclosure present technological improvements as solutions to one or more of the above-mentioned technical problems recognized by the inventors in conventional systems. For example, in one embodiment, a hybrid communication network is provided. The hybrid communication network includes at least one Terrestrial Trunked Radio (TETRA) location server from a LMR network, a plurality of TETRA Mobile Stations (MS), wherein each of the plurality of TETRA MS is in communication with the TETRA location server, an Interworking Module (IM), and a Mission Critical Push-To-Talk (MCPTT) server from a MCPTT network. The MCPTT server obtains location information of at least one of the plurality of TETRA MS. In the process of obtaining the location information of the at least one LMR MS, the MCPTT server transmits a set of location procedures in a first SIP (Session Initiation Protocol) message to the IM, wherein the first SIP message indicates the type of the location information required and at least one trigger in response to which the location information of the at least one TETRA MS is to be shared with the MCPTT server. The IM selects a first Location Information Protocol (LIP) message equivalent to the first SIP message from a set of LIP messages, wherein the first LIP message is selected based on a pre-defined mapping of the first SIP message with the first LIP message, wherein the set of LIP messages are based on an LIP protocol. The IM then transmits the first LIP message to the TETRA Location Server. The IM receives a second LIP message from the TETRA Location Server, wherein the second LIP message indicates one of an acknowledgement that the TETRA Location Server is in receipt of the first LIP message and a confirmation on whether or not the TETRA Location Server updated the location configuration on the TETRA MS. The IM then selects a second SIP message equivalent to the second LIP message from the set of SIP messages, wherein the second SIP message is selected based on a pre-defined mapping of the second LIP message with the second SIP message. The IM then transmits the selected second SIP message to the MCPTT Server.

In another aspect, a processor implemented method for communication is provided. In this method, a Mission Critical Push-To-Talk (MCPTT) server transmits a set of location procedures in a first SIP (Session Initiation Protocol) message to an Interworking Module (IM), wherein the first SIP message indicates the type of the location information required and at least one trigger in response to which the location information of the at least one Terrestrial Trunked Radio (TETRA) Mobile Station (MS) is to be shared with the MCPTT server. The IM selects a first Location Information Protocol (LIP) message equivalent to the first SIP message from a set of LIP messages, wherein the first LIP message is selected based on a pre-defined mapping of the first SIP message with the first LIP message, wherein the set of LIP messages are based on an LIP protocol. The IM then transmits the first LIP message to the TETRA Location Server. The IM receives a second LIP message from the TETRA Location Server, wherein the second LIP message indicates one of an acknowledgement that the TETRA Location Server is in receipt of the first LIP message and a confirmation on whether or not the TETRA Location Server updated the location configuration on the TETRA MS. The IM then selects a second SIP message equivalent to the second LIP message from the set of SIP messages, wherein the second SIP message is selected based on a pre-defined mapping of the second LIP message with the second SIP message. The IM then transmits the selected second SIP message to the MCPTT Server.

In yet another aspect, a non-transitory computer readable medium for mapping of messages transmitted between a Mission Critical Push-To-Talk (MCPTT) server and a TETRA location server is provided. The non-transitory computer readable medium obtains a first Session Initiation Protocol (SIP) message from the MCPTT server, wherein the first SIP message indicates the type of the location information required and at least one trigger in response to which the location information of the at least one Terrestrial Trunked Radio (TETRA) Mobile Station (MS) is to be shared with the MCPTT server. The non-transitory computer readable medium selects a first Location Information Protocol (LIP) message equivalent to the first SIP message from a set of LIP messages, wherein the first LIP message is selected based on a pre-defined mapping of the first SIP message with the first LIP message, wherein the set of LIP messages are based on an LIP protocol. The non-transitory computer readable medium then transmits the first LIP message to the TETRA Location Server. The non-transitory computer readable medium then receives a second LIP message from the TETRA Location Server, wherein the second LIP message indicates one of an acknowledgement that the TETRA Location Server is in receipt of the first LIP message and a confirmation on whether or not the TETRA Location Server updated the location configuration on the TETRA MS. The non-transitory computer readable medium then selects a second SIP message equivalent to the second LIP message from the set of SIP messages, wherein the second SIP message is selected based on a pre-defined mapping of the second LIP message with the second SIP message. The non-transitory computer readable medium then transmits the selected second SIP message to the MCPTT Server. In the hybrid communication network, the non-transitory computer readable medium maybe implemented in an Interworking Module (IM).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
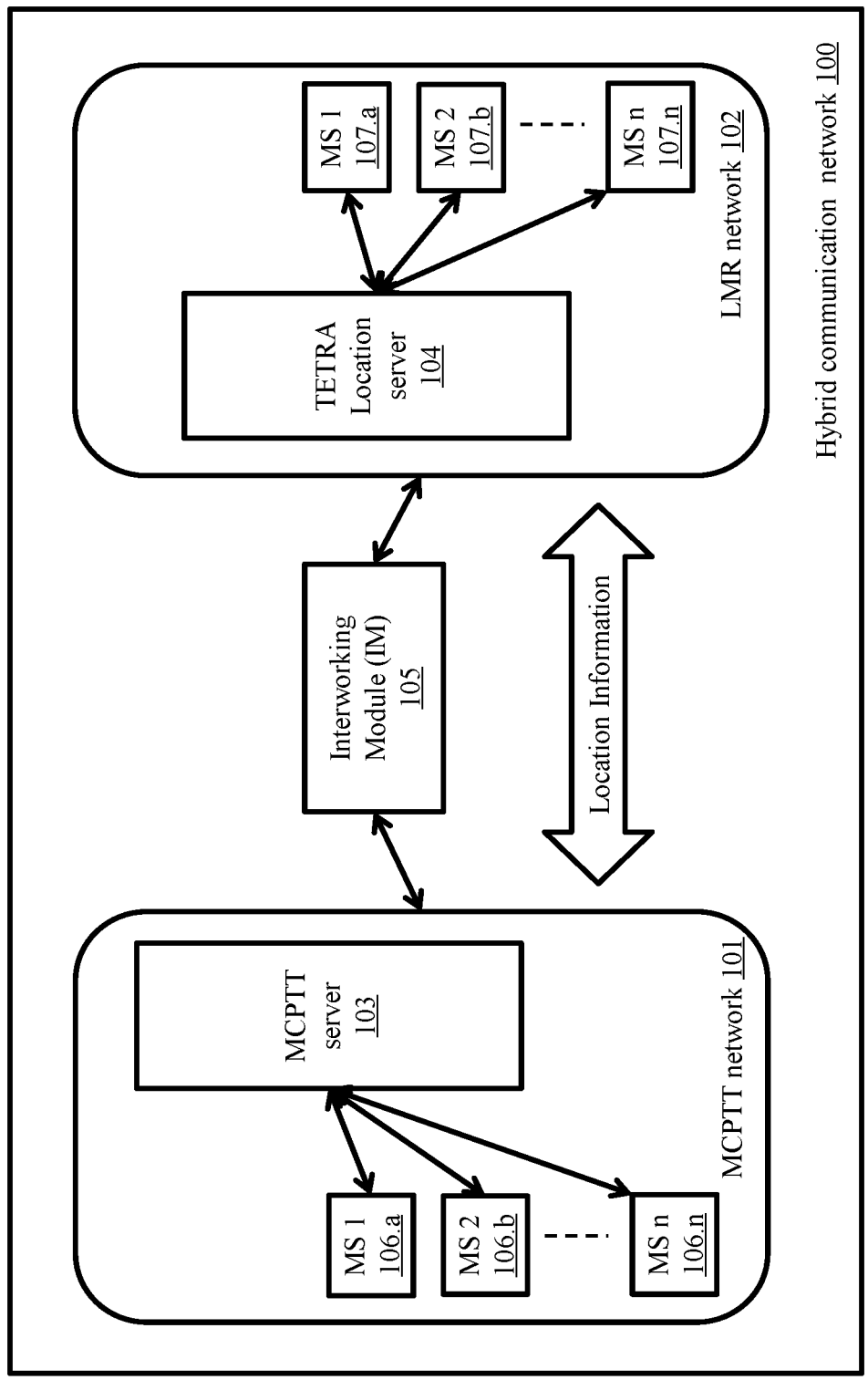
FIG. 1 illustrates an exemplary hybrid communication network, according to some embodiments of the present disclosure.
Figure 2:
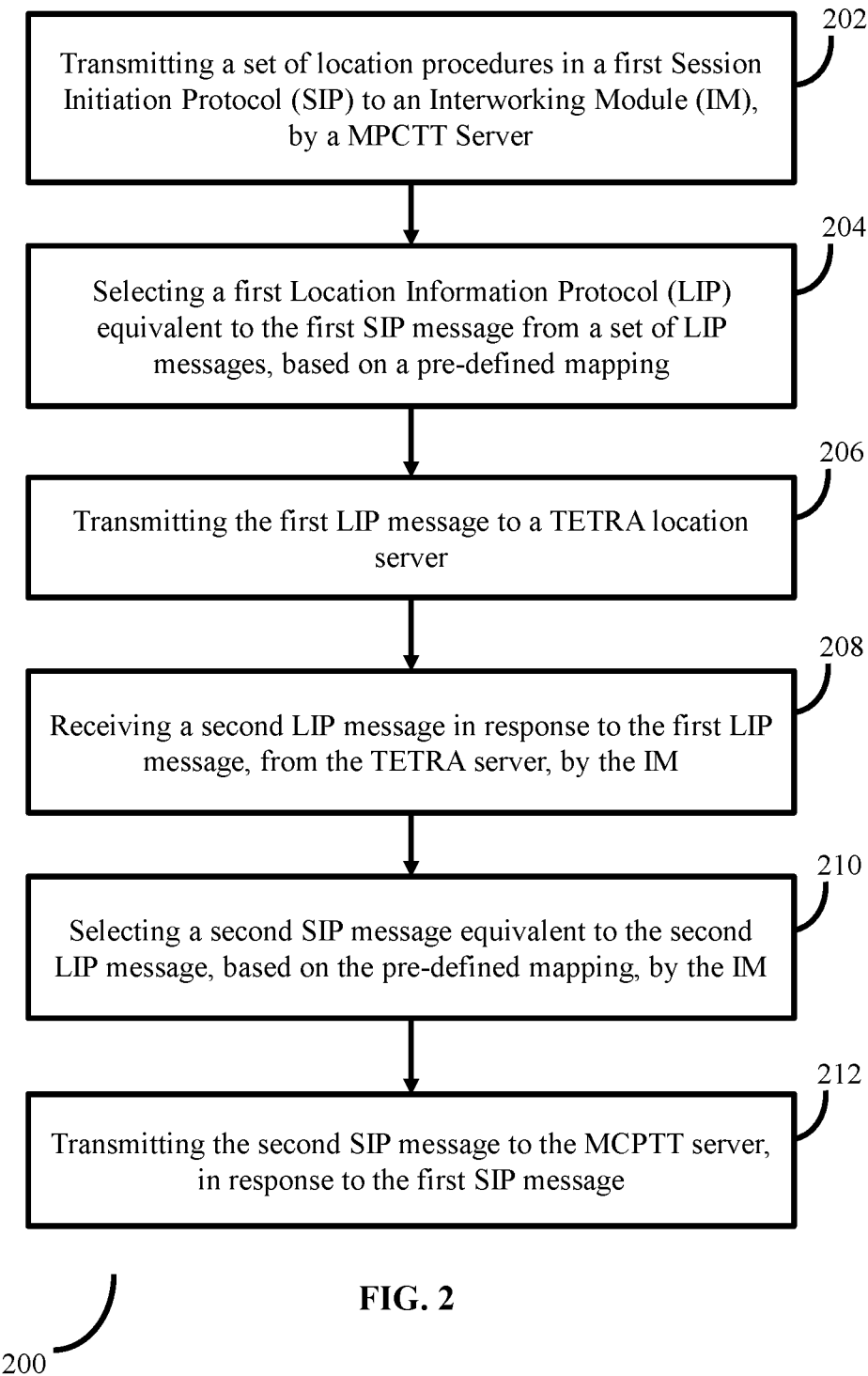
FIG. 2 is a flow diagram depicting steps involved in the process of location information exchange between an MCPTT server and a TETRA location server in the hybrid communication network of FIG. 1, according to some embodiments of the present disclosure.

FIG. 1 illustrates an exemplary hybrid communication network, according to some embodiments of the present disclosure. The hybrid communication network 100 includes a mission critical push-to-talk (MCPTT) network 101, a Land Mobile Radio (LMR) network 102, and an Interworking Module (IM) 105. The MCPTT network 101 includes a MCPTT server 103 which is in communication with a plurality of Mobile Stations 106 (MCPTT MS). The LMR network 102 includes a terrestrial trunked radio (TETRA) Location server 104 which is in communication with a plurality of Mobile Stations (MS)/TETRA MS 107. Working of the hybrid communication network 100 is explained with reference to FIG. 2, FIG. 3, and FIG. 4.

In an interworking scenario, the MCPTT server 101 requires location information pertaining to one or more MSs 107 associated with the TETRA location server 104. In order to obtain the location information, the MCPTT server 101 transmits (202) a set of location procedures (including 'Location Reporting Configuration', '200 OK', and 'Location Information Report') in a first Session Initiation Protocol (SIP) message to the IM 105, wherein the first SIP message indicates the type of the location information required and at least one trigger in response to which the location information of the at least one TETRA MS//TETRA device (107) is to be shared with the MCPTT server 103.

The IM 105 receives first SIP message and performs a protocol and payload conversion. During the protocol and payload conversion, the IM selects (204) a first Location Information Protocol (LIP) message equivalent to the first SIP message from a set of LIP messages including 'Basic Location Parameter Request', and 'Basic Location Parameter Response', ADD/MODIFY Trigger Request, Long Location Report, and Immediate Location Report Request. In an embodiment, the selection of the first LIP message equivalent to the first SIP message is based on a pre-defined mapping of a plurality of SIP messages and corresponding LIP messages. The selected first LIP message is then transmitted (206) to the TETRA location server 104. The TETRA location server 104 fetches the first LIP message, and sends a second LIP message in response to the IM 105 from the set of LIP messages. The second LIP message indicates one of an acknowledgement that the TETRA Location Server is in receipt of the first LIP message and a confirmation on whether or not the TETRA Location Server updated the location configuration on the TETRA MS 107.

The IM 105 receives (208) the second LIP message and selects (210) a second SIP message (having location procedures including set of location procedures including 'Location Reporting Configuration', '200 OK', and 'Location Information Report') which is equivalent to the second LIP message, from a set of SIP messages, based on a pre-defined mapping between SIP and LIP messages. The second LIP message is then transmitted (212) to the MCPTT server 103 as a response to the first SIP message, by the IM.

As the first SIP message, and the corresponding first LIP message specify the type of trigger in response to which the location information of the MS is to be shared with the MCPTT server, upon detecting occurrence of the specified trigger, the MS 107 updates own location with the TETRA location server 104, which in turn transmits the location information to the MCPTT server 103.

Figure 3:
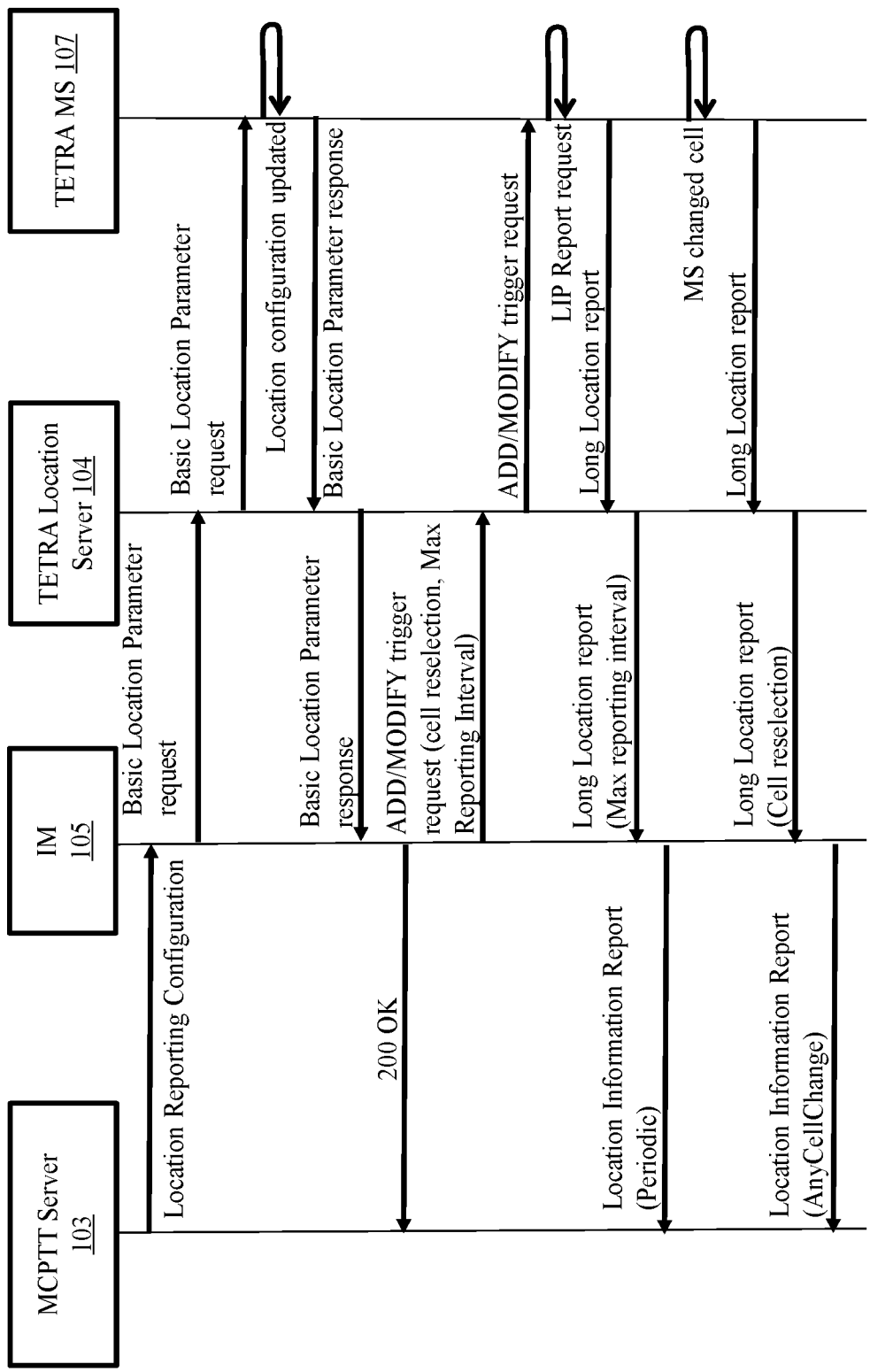
FIG. 3 illustrates flow of messages between components of the hybrid communication network during location information exchange for Periodic and cellChange triggers, in accordance with some embodiments of the present disclosure.

Type of messages and parameters used vary for different types of triggers used. The protocol and payload conversion in different scenarios (in terms of trigger specified) are explained below:

1. For Periodic/CellChange Triggers:

The various messages and parameters used for the Periodic/CellChange triggers are depicted in FIG. 3. The MCPTT server 103 transmits a 'Location Reporting Configuration' SIP message as the first SIP message to the IM 105. The Periodic triggers specifies that the location information is to be transmitted periodically, and time interval between every successive transmission of the location information may be specified in the 'Location Reporting Configuration' SIP message. The CellChange trigger specifies that location information of a targeted MS 107 to be sent every time the MS 107 changes current serving cell. The type of the location information required may be 'Geographical coordinates', and may vary based on requirements.

The IM 105 maps the 'Location Reporting Configuration' SIP message to a 'Basic Location Parameter Request' LIP message, based on the pre-defined mapping, and transmits the 'Basic Location Parameter Request' LIP message to the TETRA Location Server 104 to configure a minimum location reporting interval and report type for the MS 107 via the TETRA Location Server 104. Mappings performed by the IM 105 at this stage are given below:

Message Mapping:

| MCPTT | TETRA |
| --- | --- |
| Location Reporting Configuration | Basic Location Parameter Request |

Parameter Mapping:

| MCPTT | TETRA |
| --- | --- |
| Configuration | LIP-Basic LOCATION PARAMETER REQUEST |
| minimumIntervalLength | Minimum reporting interval |
| GeographicalCoordinate | Long location report preferred with no time information |
| To Header | Address or identification type |

Contents of the Basic LOCATION PARAMETER REQUEST LIP Message are Given Below:

| Information element | Value |
| --- | --- |
| PDU type | Long location message |
| PDU Type Extension | LIP-Basic LOCATION PARAMETER REQUEST |
| Acknowledgement request | Acknowledgement requested |
| Minimum reporting interval | 10 s |
| Report type | Long location report preferred with no time information |
| Terminal or location identification | Present |
| Address or identification type | SSI + MNI |
| Location information destination | T5 present |
| Address or identification type | IM address |

After the MS 107 updates its location configuration, the MS 107 sends the 'BASIC Location Parameter Response' acknowledgement LIP message to the TETRA location server 104. The TETRA location server 104 transmits the 'BASIC Location Parameter Response' LIP message to the IM 105. A result code in the 'BASIC Location Parameter Response' message indicates whether the configuration of location information was successful or not.

'Basic Location Parameter Response' LIP Message Contents:

| Information element | Value |
| --- | --- |
| PDU type | Long location message |
| PDU Type Extension | LIP-Basic LOCATION PARAMETER RESPONSE |
| Result code | Success |
| Location reporting enable flags | Location reporting globally |
| Minimum reporting interval | 10 s |
| Report type | Long location report preferred with no time information |
| Terminal or location identification | Present |
| Address or identification type | SSI + MNI |
| Location information destination | T5 present |
| Address or identification type | IM address |

Based on the pre-defined mapping of SIP messages and corresponding LIP messages, the IM 105 maps the 'BASIC Location Parameter Response' LIP message to a '200 OK' SIP acknowledge message. The IM 105 further transmits the '200 OK' SIP acknowledge message to the MCPTT server 103 so as to acknowledge that the 'Location reporting configuration' SIP message been processed.

The message mapping done by the IM 105 at this stage is:

| TETRA | MCPTT |
| --- | --- |
| Basic Location Parameter Response | 200 OK |

The 200 OK message includes:

Session Initiation Protocol (200 OK)

From: <sip:SSI+MNI@tetraSwMI.org>

To: <sip:mcptt-server-orig-part@mycompany.org>

Call-ID: The request call identifier

The IM 105 maps triggers in the 'Location reporting Configuration' SIP message to 'ADD/MODIFY TRIGGER Request' LIP message and transmits the 'ADD/MODIFY TRIGGER Request' LIP message to the TETRA Location server 104, so as to trigger the location reporting for the MS 107 whenever the MS 107 changes current serving cell or reaches a maximum reporting interval. Mappings performed by the IM 105 during this process are given below:

Message Mapping:

| MCPTT | TETRA |
| --- | --- |
| Location reporting Configuration | ADD/MODIFY TRIGGER Request |

Parameter Mapping:

| MCPTT | TETRA |
|---|---|
| Triggering Criteria | Trigger Type |

Contents of the ADD/MODIFY TRIGGER Request LIP Message are:

| Information element | Value |
|---|---|
| PDU type | Long location message |
| PDU Type Extension | LIP-ADD/MODIFY TRIGGER REQUEST |
| Acknowledgement request | No acknowledgement requested |
| Report type | Long location report preferred with no time information |
| Terminal or location identification | Present |
| Address or identification type | SSI + MNI |
| Location information destination | T5 present |
| Address or identification type | IM address |
| Start time | DD/HH/MM/SS |
| Stop time | DD/HH/MM/SS |
| Trigger definition | Present |
| Trigger type | Maximum reporting interval |
| Maximum reporting interval | 30 s |
| One-shot/recurring | One-shot/Recurring |
| Trigger type | Change of serving cell |
| One-shot/recurring | One-shot/Recurring |

When the Periodic trigger (and a corresponding time interval) is specified, upon expiry of the specified time interval, the MS 107 transmits 'Long Location Report' LIP message to the TETRA Location server 104. The TETRA Location server 104 transmits the 'Long Location Report' LIP message to the IM 105.

Contents of the 'Long Location Report' LIP message for 'Periodic' trigger are:

| Information element | Value |
|---|---|
| PDU type | Long location message |
| PDU Type Extension | LIP-LONG LOCATION REPORT |
| Time data | None |
| Location data | Location Point |
| Longitude | 33.34232 |
| Latitude | 55.123663 |
| Velocity data | No velocity information |
| Acknowledgement request | No acknowledgement requested |
| Type of additional data | Reason for sending |
| User defined data | Maximum reporting interval exceeded since the last location report |
| Terminal or location identification | T5 present |
| Address or identification type | SSI + MNI |

The IM 105 maps the 'Long Location Report' LIP message to 'Location Information Report' SIP message so as to send periodic location report of the MS 107 to the MCPTT server 103. Mappings performed by the IM 105 at this stage are:

Message Mapping:

| TETRA | MCPTT |
|---|---|
| Long Location report | Location Information Report |

Parameter Mapping:

| TETRA | MCPTT |
|---|---|
| Location data | CurrentCoordinate |
| User defined data | TriggerId |
| Address or identification type | From header |

Contents of the Location Information Report SIP Message are:

```
Session Initiation Protocol (MESSAGE)
    From: <sip:SSI+MNI@tetraSwMI.org>
    To: <sip:mcptt-server-orig-part@mycompany.org>
    Content-Type: application/vnd.3gpp.mcptt-location-info+xml
    Message Body
        eXtensible Markup Language
            <location-info>
                <Report
                    ReportType="NonEmergency">
                    <CurrentLocation>
                        <CurrentCoordinate>
                            <latitude>
                                55.123663
                            </latitude>
                            <longitude>
                                33.34232
                            </longitude>
                        </CurrentCoordinate>
                    </CurrentLocation>
                    <TriggerId>
                        Periodic
                    </TriggerId>
                </Report>
            </location-info>
```

If the trigger is 'CellChange', then the MS 107 updates location information by sending the 'Long Location Report' LIP message to the TETRA Location server 104. The TETRA Location server 104 transmits the 'Long Location Report' LIP message to the IM 105.

Contents of the 'Long Location Report' LIP message for the cellChange trigger are:

| Information element | Value |
|---|---|
| PDU type | Long location message |
| PDU Type Extension | LIP-LONG LOCATION REPORT |
| Time data | None |
| Location data | Location Point |
| Longitude | 33.34232 |
| Latitude | 55.123663 |
| Velocity data | No velocity information |
| Acknowledgement request | No acknowledgement requested |
| Type of additional data | Reason for sending |
| User defined data | Cell Reselection |
| Terminal or location identification | T5 present |
| Address or identification type | SSI + MNI |

The IM 105 maps the 'Long Location Report' LIP message to 'Location Information Report' SIP message, and transmits a CellChange location report of the MS 107 to the MCPTT server 103. Mappings performed by the IM 105 at this stage are:

Message Mapping:

| TETRA | MCPTT |
|---|---|
| Long Location Report | Location Information Report |

Parameter Mapping:

| TETRA | MCPTT |
|---|---|
| Location data | CurrentCoordinate |
| User defined data | TriggerId |
| Address or identification type | From header |

Contents of the 'Location Information Report' for the CellChange Trigger are:

```
Session Initiation Protocol (MESSAGE)
    From: <sip:SSI+MNI@tetraSwMI.org>
    To: <sip:mcptt-server-orig-part@mycompany.org>
    Content-Type: application/vnd.3gpp.mcptt-location-info+xml
    Message Body
        eXtensible Markup Language
            <location-info>
                <Report
                    ReportType="NonEmergency">
                    <CurrentLocation>
                        <CurrentCoordinate>
                            <latitude>
                                55.123663
                            </latitude>
                            <longitude>
                                33.34232
                            </longitude>
                        </CurrentCoordinate>
                    </CurrentLocation>
                    <TriggerId>
                        AnyCellChange
                    </TriggerId>
                </Report>
            </location-info>
```

Figure 4:
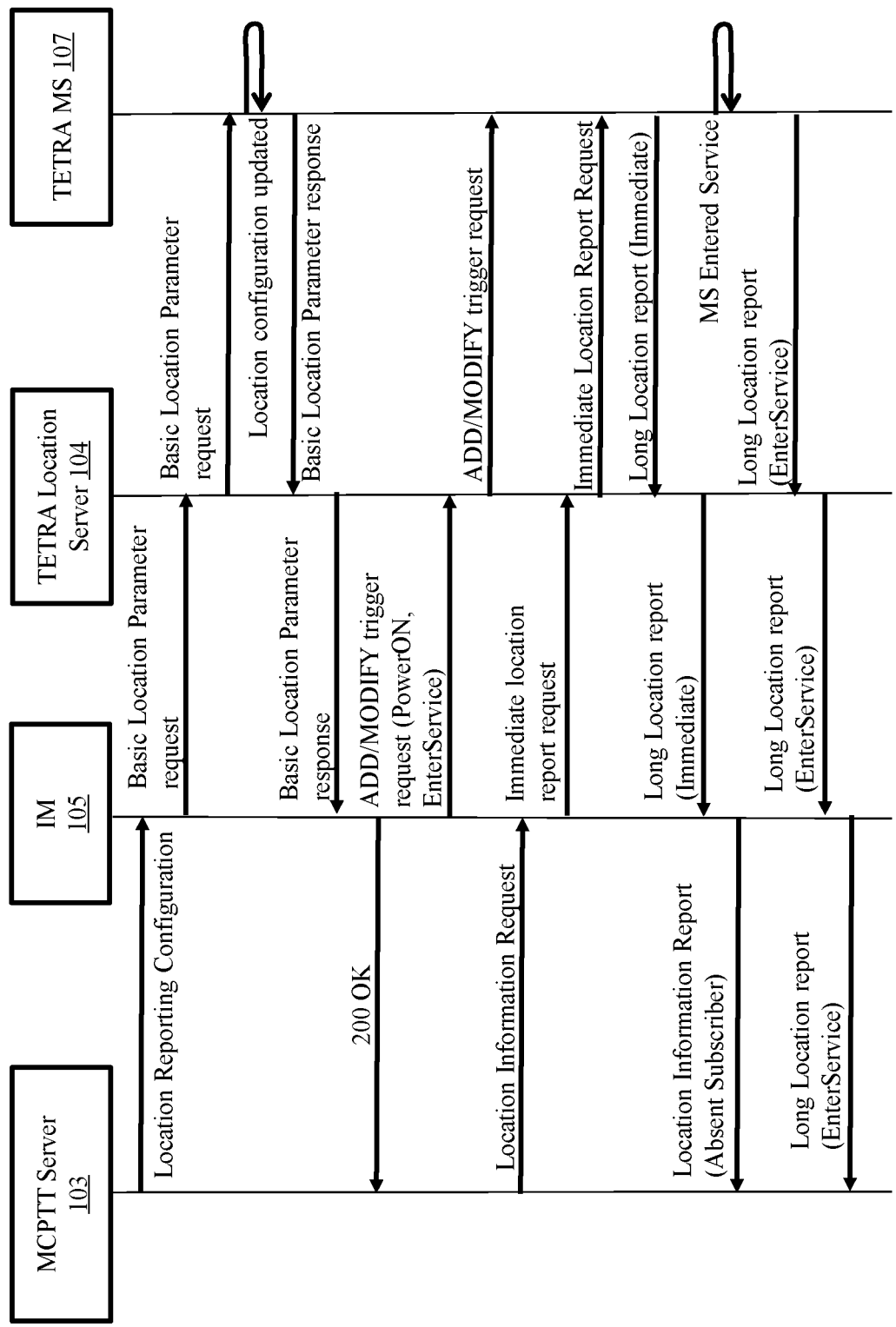
FIG. 4 illustrates flow of messages between components of the hybrid communication network during location information exchange for Immediate Request, PowerOn, and EnterService triggers, in accordance with some embodiments of the present disclosure.

2. For Immediate Requests/PowerOn Trigger/EnterService Trigger:

Protocol and payload conversion details for the Immediate requests, PowerOn trigger, and the EnterService trigger are explained in reference to FIG. 4, below. The PowerOn trigger, and the EnterService trigger are newly defined triggers for obtaining location information in certain use-cases. The PowerOn trigger is to obtain the location information when the MS 107 is powered ON from an OFF state. The EnterService trigger is to obtain the location information when the MS 107 enters the service. Mapping of extensions to known 'TriggeringCriteria' to the MCPTT server 103 is enabled using 'anyExt' element of 'TriggeringCriteriaType'.

The MCPTT server 103 transmits the 'Location Reporting Configuration' SIP message to the IM 105 in order to configure the triggers PowerOn and EnterService. Contents of the 'Location Reporting Configuration' SIP message are:

```
Session Initiation Protocol (MESSAGE)
    From: <sip:mcptt-server-orig-part@mycompany.org>
    To: <sip:SSI+MNI@tetraSwMI.org>
    Call-ID: The request call identifier
    Content-Type: application/vnd.3gpp.mcptt-location-info+xml
    Message Body
        eXtensible Markup Language
            <?xml
                version="1.0"
                encoding="UTF-8"
            ?>
            <location-info
                xmlns="urn:3gpp:ns:mcpttLocationInfo:1.0">
                <Configuration>
                    <NonEmergencyLocationInformation>
                        <GeographicalCordinate/>
                        <minimumIntervalLength>
                            10
                        </minimumIntervalLength>
                    </NonEmergencyLocationInformation>
                    <TriggeringCriteria>
                        <Tetra_Trigger1>
                            <PowerOn
                                TriggerId="PowerOn"/>
                        </Tetra_Trigger1>
                        <Tetra_Trigger2>
                            <EnterService
                                TriggerId="EnterService"/>
                        </Tetra_Trigger2>
                    </TriggeringCriteria>
                </Configuration>
            </location-info>
```

The IM 105 maps the 'Location reporting Configuration' SIP message to a 'Basic Location Parameter Request' LIP message and transmits the 'Basic Location Parameter Request' LIP message to the TETRA Location server 104, so as to configure the minimum location reporting interval and the report type for the MS 107. Contents of the 'Basic Location Parameter Request' LIP message are:

| Information element | Value |
|---|---|
| PDU type | Long location message |
| PDU Type Extension | LIP-Basic LOCATION PARAMETER REQUEST |
| Acknowledgement request | Acknowledgement requested |
| Minimum reporting interval | 10 s |
| Report type | Long location report preferred with no time information |
| Terminal or location identification | Present |
| Address or identification type | SSI + MNI |
| Location information destination | T5 present |
| Address or identification type | IM address |

After updating location configuration, the MS 107 sends a 'Basic Location Parameter response' acknowledgement LIP message to the TETRA location server 104. The TETRA location server 104 transmits the 'Basic Location Parameter response' acknowledgement LIP message to the IM 105. A 'Result Code' in the 'Basic Location Parameter response' acknowledgement LIP message indicates whether the configuration was successful or not. Contents of the 'Basic Location Parameter response' acknowledgement LIP message are:

| Information element | Value |
|---|---|
| PDU type | Long location message |
| PDU Type Extension | LIP-Basic LOCATION PARAMETER RESPONSE |
| Result code | Success |
| Location reporting enable flags | Location reporting globally |

| Information element | Value |
|---|---|
| Minimum reporting interval | 10 s |
| Report type | Long location report preferred with no time information |
| Terminal or location identification | Present |
| Address or identification type | SSI + MNI |
| Location information destination | T5 present |
| Address or identification type | IM address |

The IM 105 maps the 'Basic Location Parameter response' acknowledgement LIP message to '200 OK' SIP acknowledge message and transmits the '200 OK' SIP acknowledge message to the MCPTT server 103 to acknowledge that the 'Location Reporting Configuration' SIP message has been processed. Contents of the '200 OK' SIP acknowledge message are:

Session Initiation Protocol (200 OK)

From: <sip: SSI+MNI@tetraSwMI.org>

To: <sip:mcptt-server-orig-part@mycompany.org>

Call-ID: The request call identifier

The IM 105 maps triggers in the 'Location Reporting Configuration' SIP message to 'ADD/MODIFY TRIGGER Request' LIP message and transmits to the TETRA Location Server 104. The mappings performed by the IM 105 at this stage are:

Message Mapping:

| MCPTT | TETRA |
|---|---|
| Location reporting configuration | ADD/MODIFY TRIGGER Request |

Parameter Mapping:

| MCPTT | TETRA |
|---|---|
| TriggeringCriteria | Trigger Type |

Contents of the ADD/MODIFY TRIGGER LIP Request are:

| Information element | Value |
|---|---|
| PDU type | Long location message |
| PDU Type Extension | LIP-ADD/MODIFY TRIGGER REQUEST |
| Acknowledgement request | No acknowledgement requested |
| Report type | Long location report preferred with no time information |
| Terminal or location identification | Present |
| Address or identification type | SSI + MNI |
| Location information destination | T5 present |
| Address or identification type | IM address |
| Start time | DD/HH/MM/SS |
| Stop time | DD/HH/MM/SS |
| Trigger definition | Present |
| Trigger type | Subscriber unit is powered ON |
| One-shot/recurring | One-shot/Recurring |
| Trigger type | Enter service (after being out of service) |
| One-shot/recurring | One-shot/Recurring |

Upon detecting that the MS 107 is not under TETRA service, the MS 107 or the TETRA Location Server 104 builds and sends a 'Long Location Report' LIP message for on-demand immediate location request. A 'Result Code' parameter in the 'Long Location Report' LIP message indicates that the MS 107 is not under TETRA service. Contents of the Long Location Report are:

| Information element | Value |
|---|---|
| PDU type | Long location message |
| PDU Type Extension | LIP-LONG LOCATION REPORT |
| Time data | None |
| Location data | No Shape |
| Velocity data | No velocity information |
| Acknowledgement request | No acknowledgement requested |
| Type of additional data | Reason for sending |
| User defined data | <Any Data> |
| Terminal or location identification | T5 present |
| Address or identification type | SSI + MNI |
| Result code | Absent Subscriber |

The IM maps the 'Long Location report' LIP message to 'Location Information Report' SIP message so as to send the immediate location report response of the MS 107 to the MCPTT server 103. 'AnyExt' extension field in the 'Location Information Report' SIP message is used to indicate the 'Result Code' to the MCPTT server 103. Mapping done by the IM 105 at this stage are:

Message Mapping:

| TETRA | MCPTT |
|---|---|
| Long Location report | Location Information Report |

Parameter Mapping:

| TETRA | MCPTT |
|---|---|
| Result Code | AnyExt (AnyResultcode) |

Contents of the Location Information Report SIP Message are:

Session Initiation Protocol (MESSAGE)
    From: <sip:SSI+MNI@tetraSwMI.org>
    To: <sip:mcptt-server-orig-part@mycompany.org>
    Content-Type: application/vnd.3gpp.mcptt-location-info+xml
    Message Body
        eXtensible Markup Language
            <location-info>
                <Report
                    ReportID="IMMREPID1"
                    ReportType="NonEmergency">
                    <AnyResultcode>
                        Absent Subscriber
                    </AnyResultcode>
                </Report>
            </location-info>

If the EnterService trigger is configured, when the MS 107 enters the service it detects the EnterService trigger, and in response sends the 'Long Location Report' LIP message to the TETRA Location server 104. The TETRA Location server 104 transmits the 'Long Location Report' LIP message to the IM 105. Contents of the 'Long Location Report' LIP message are:

| Information element | Value |
| --- | --- |
| PDU type | Long location message |
| PDU Type Extension | LIP-LONG LOCATION REPORT |
| Time data | None |
| Location data | Location Point |
| Longitude | 33.34232 |
| Latitude | 55.123663 |
| Velocity data | No velocity information |
| Acknowledgement request | No acknowledgement requested |
| Type of additional data | Reason for sending |
| User defined data | Enter Service |
| Terminal or location identification | T5 present |
| Address or identification type | SSI + MNI |

The IM 105 maps the Long Location report LIP message to 'Location Information Report' SIP message, and transmits to the MCPTT server 103 as a location report response of the MS 107. Mapping performed by the IM 105 at this stage are:

Message Mapping:

| TETRA | MCPTT |
| --- | --- |
| Long Location Report | Location Information Report |

Parameter Mapping:

| TETRA | MCPTT |
| --- | --- |
| Location data | CurrentCoordinate |
| User defined data | TriggerId |

Contents of the Location Information Report are:

```
Session Initiation Protocol (MESSAGE)
    From: <sip:SSI+MNI@tetraSwMI.org>
    To: <sip:mcptt-server-orig-part@mycompany.org>
    Content-Type: application/vnd.3gpp.mcptt-location-info+xml
    Message Body
        eXtensible Markup Language
            <location-info>
                <Report
                    ReportType="NonEmergency">
                    <CurrentLocation>
                        <CurrentCoordinate>
                            <latitude>
                                55.123663
                            </latitude>
                            <longitude>
                                33.34232
                            </longitude>
                        </CurrentCoordinate>
                    </CurrentLocation>
                    <TriggerId>
                        EnterService
                    </TriggerId>
                </Report>
            </location-info>
```

During the protocol conversion and mapping for various triggers, the IM 105 performs at least the following mappings: a Location Reporting Configuration' SIP message to a 'Basic Location Parameter Request' LIP message, a 'Configuration' parameter in the 'Location Reporting Configuration' SIP message to a 'LIP-Basic LOCATION PARAMETER REQUEST' in a 'Basic Location Parameter Request' LIP message, a 'minimumIntervalLength' parameter in the 'Location Reporting Configuration' SIP message to a 'Minimum reporting interval' in the 'Basic Location Parameter Request' LIP message, a 'GeographicalCordinate' parameter in the 'Location Reporting Configuration' SIP message to a 'Long location report preferred with no time information' in the 'Basic Location Parameter Request' LIP message, and a 'To header' parameter in the 'Location Reporting Configuration' SIP message to a 'Address or identification type' in the 'Basic Location Parameter Request' LIP message, a 'Location Reporting Configuration' SIP message to a 'ADD/MODIFY TRIGGER Request' LIP message, a 'TriggeringCriteria' parameter in the 'Location Reporting Configuration' SIP message to a 'Trigger type' in a 'ADD/MODIFY TRIGGER Request' LIP message, a 'Long Location Report' LIP message to a 'Location Information Report' SIP message, a 'Location data' parameter in the 'Long Location Report' LIP message to a 'CurrentCoordinate' in the 'Location Information Report' SIP message, a 'User defined data' parameter in the 'Long Location Report' LIP message to a 'TriggerId' in the 'Location Information Report' SIP message, 'Address or identification type' parameter in the 'Long Location Report' LIP message to a 'From header' in a 'Location Information Report' SIP message, a 'Long Location Report' LIP message to a 'Location Information Report' SIP message; 'Result code' parameter in the 'Long Location Report' LIP message to a 'AnyResultcode' in a 'Location Information Report' SIP message, a 'Location Information Request' SIP Message to a 'Immediate Location Report Request', a 'Request' parameter in the 'Location Information Request' SIP Message to a 'LIP-Immediate LOCATION Report REQUEST' in the 'Immediate Location Report Request' LIP message, and a 'Basic Location Parameter Response' LIP Message to a '200 OK SIP' Message. The IM 105 also maps IM maps the periodic trigger to a 'maximum reporting interval trigger' on TETRA side, the cellChange trigger to a 'Change of serving cell trigger' on the TETRA side, the PowerOn trigger to a 'Subscriber unit is powered ON' trigger on the TETRA side, and the EnterService trigger to a 'Enter service trigger' on the TETRA side.

The method 200 allows the MCPTT server 103 in 4G/5G communication networks (including WiFi) to collect location information of one or more TETRA MS 107. The location information thus obtained may be used for various applications such as but not limited to interworking of the LMR network 102 and the MCPTT network 101. The MCPTT server 103 in the 4G/5G communication networks is collectively referred to as NextGen mission critical networks, in context of the description provided.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A hybrid communication network, comprising:
   at least one Terrestrial Trunked Radio (TETRA) location server from a Land Mobile Radio (LMR) network;
   a plurality of TETRA Mobile Stations (MS), wherein each of the plurality of TETRA MS is in communication with the TETRA location server;
   an Interworking Module (IM); and
   a Mission Critical Push-To-Talk (MCPTT) server (103) from a MCPTT network, wherein the MCPTT server obtains location information of at least one of the plurality of TETRA MS, wherein the process of obtaining the location information of the at least one TETRA MS comprises:
     transmitting a set of location procedures in a first SIP (Session Initiation Protocol) message to the IM by the MCPTT server, wherein the first SIP message indicates the type of the location information required and at least one trigger in response to which the location information of the at least one TETRA MS is to be shared with the MCPTT server;
     selecting by the IM, a first Location Information Protocol (LIP) message equivalent to the first SIP message from a set of LIP messages, wherein the first LIP message is selected based on a pre-defined mapping of the first SIP message with the first LIP message, wherein the set of LIP messages are based on an LIP protocol;
     transmitting, by the IM, the first LIP message to the TETRA Location Server;
     receiving, by the IM, a second LIP message from the TETRA Location Server, wherein the second LIP message indicates one of an acknowledgement that the TETRA Location Server is in receipt of the first LIP message and a confirmation on whether or not the TETRA Location Server updated the location configuration on the TETRA MS;
     selecting, by the IM, a second SIP message equivalent to the second LIP message from the set of SIP messages, wherein the second SIP message is selected based on a pre-defined mapping of the second LIP message with the second SIP message; and
     transmitting, by the IM, the selected second SIP message to the MCPTT Server.

2. The hybrid communication network as claimed in claim 1, wherein the set of Location procedures in the first SIP message and the second SIP message comprises of 'Location Reporting Configuration', '200 OK', and 'Location Information Report'.

3. The hybrid communication network as claimed in claim 1, wherein each of the first LIP message and the second LIP message comprises at least one of a 'Basic Location Parameter Request', a 'Basic Location Parameter Response', an 'ADD/MODIFY Trigger Request', a 'Long Location Report', and an 'Immediate Location Report Request'.

4. The hybrid communication network as claimed in claim 2, wherein the IM maps a 'Location Reporting Configuration' SIP message to a 'Basic Location Parameter Request' LIP message, a 'Configuration' parameter in the 'Location Reporting Configuration' SIP message to a 'LIP-Basic LOCATION PARAMETER REQUEST' in the 'Basic Location Parameter Request' LIP message, a 'minimumInterval-Length' parameter in the 'Location Reporting Configuration' SIP message to a 'Minimum reporting interval' in the 'Basic Location Parameter Request' LIP message, a 'GeographicalCordinate' parameter in the 'Location Reporting Configuration' SIP message to a 'Long location report preferred with no time information' in the 'Basic Location Parameter Request' LIP message, and a 'To header' parameter in the 'Location Reporting Configuration' SIP message to a 'Address or identification type' in the 'Basic Location Parameter Request' LIP message.

5. The hybrid communication network as claimed in claim 2, wherein the IM maps a 'Location Reporting Configuration' SIP message to a 'ADD/MODIFY TRIGGER Request' LIP message, a 'TriggeringCriteria' parameter in the 'Location Reporting Configuration' SIP message to a 'Trigger type' in the 'ADD/MODIFY TRIGGER Request' LIP message, a 'Long Location Report' LIP message to a 'Location Information Report' SIP message, a 'Location data' parameter in the 'Long Location Report' LIP message to a 'CurrentCoordinate' in the 'Location Information Report' SIP message, a 'User defined data' parameter in the 'Long Location Report' LIP message to a 'TriggerId' in the 'Location Information Report' SIP message, 'Address or identification type' parameter in the 'Long Location Report' LIP message to a 'From header' in the 'Location Information Report' SIP message, a 'Long Location Report' LIP message to the 'Location Information Report' SIP message, a 'Result code' parameter in the 'Long Location Report' LIP message to a 'AnyResultcode' in the 'Location Information Report' SIP message, a 'Location Information Request' SIP Message to an 'Immediate Location Report Request', a 'Request' parameter in the 'Location Information Request' SIP Message to a 'LIP-Immediate LOCATION Report REQUEST' in the 'Immediate Location Report Request' LIP message, and a 'Basic Location Parameter Response' LIP Message to a '200 OK' SIP Message.

6. The hybrid communication network as claimed in claim 1, wherein the at least one trigger is at least one of a periodic trigger, a cellChange trigger, a PowerOn trigger, and an EnterService trigger on MCPTT Server side.

7. The hybrid communication network as claimed in claim 6, wherein the IM maps the periodic trigger to a 'maximum reporting interval trigger' on TETRA side, the cellChange trigger to a 'Change of serving cell trigger' on the TETRA side, the PowerOn trigger to a 'Subscriber unit is powered ON' trigger on the TETRA side, and the EnterService trigger to a 'Enter service trigger' on the TETRA side.

8. The hybrid communication network as claimed in claim 6, wherein a data flow executed by the hybrid communication network for at least one of the PowerOn trigger and the EnterService trigger comprises:
- transmitting a Location Information Configuration as the first SIP message to the IM by the MCPTT server, wherein the first SIP message indicates the type of the location information required and the at least one trigger as at least one of the PowerOn trigger and the EnterService trigger;
- mapping the Location Information Configuration SIP message to a Basic Location Parameter Request LIP message and transmitting to the TETRA Location Server, by the IM;
- configuring a minimum reporting interval and a report type for at least one TETRA MS, in response to the Location Parameter Request LIP message received from the IM, by the TETRA Location Server;
- updating own location configuration and sending a 'BASIC Location Parameter Response' acknowledgement LIP message to the TETRA Location Server, by the at least one TETRA MS;
- transmitting the 'BASIC Location Parameter Response' acknowledgement LIP message received from the at least one TETRA MS to the IM, by the TETRA Location Server; and
- mapping the 'BASIC Location Parameter Response' acknowledgement LIP message received from the TETRA Location Server to '200 OK' SIP acknowledgement message and sending to the MCPTT server, by the IM, wherein the '200 OK' SIP acknowledgement message indicates to the MCPTT server that the Location Information Configuration has been processed by the at least one TETRA MS.

9. A processor implemented method for communication, comprising: transmitting a set of location procedures in a first SIP (Session Initiation Protocol) message to an Interworking Module (IM) by a Mission Critical Push-To-Talk (MCPTT) server, wherein the first SIP message indicates the type of the location information required and at least one trigger in response to which the location information of the at least one Terrestrial Trunked Radio (TETRA) Mobile Station (MS) is to be shared with the MCPTT server; selecting by the IM, a first Location Information Protocol (LIP) message equivalent to the first SIP message from a set of LIP messages, wherein the first LIP message is selected based on a pre-defined mapping of the first SIP message with the first LIP message, wherein the set of LIP messages are based on an LIP protocol; transmitting, by the IM, the first LIP message to the TETRA Location Server; receiving, by the IM, a second LIP message from the TETRA Location Server, wherein the second LIP message indicates one of an acknowledgement that the TETRA Location Server is in receipt of the first LIP message and a confirmation on whether or not the TETRA Location Server updated the location configuration on the TETRA MS; selecting, by the IM, a second SIP message equivalent to the second LIP message from the set of SIP messages, wherein the second SIP message is selected based on a pre-defined mapping of the second LIP message with the second SIP message; and transmitting, by the IM, the selected second SIP message to the MCPTT Server.

10. The method as claimed in claim 9, wherein the set of Location procedures in the first SIP message and the second SIP message comprises of 'Location Reporting Configuration', '200 OK', and 'Location Information Report'.

11. The method as claimed in claim 9, wherein each of the first LIP message and the second LIP message comprises at least one of a 'Basic Location Parameter Request', a 'Basic Location Parameter Response', an ADD/MODIFY Trigger Request, a Long Location Report, and an Immediate Location Report Request.

12. The method as claimed in claim 10, wherein the IM maps a Location Reporting Configuration' SIP message to a 'Basic Location Parameter Request' LIP message, 'Configuration' parameter in the 'Location Reporting Configuration' SIP message to a 'LIP-Basic LOCATION PARAMETER REQUEST' in the 'Basic Location Parameter Request' LIP message, a 'minimumIntervalLength' parameter in the 'Location Reporting Configuration' SIP message to a 'Minimum reporting interval' in the 'Basic Location Parameter Request' LIP message, a 'GeographicalCordinate' parameter in the 'Location Reporting Configuration' SIP message to a 'Long location report preferred with no time information' in the 'Basic Location Parameter Request' LIP message, and a 'To header' parameter in the 'Location Reporting Configuration' SIP message to an 'Address or identification type' in the 'Basic Location Parameter Request' LIP message.

13. The method as claimed in claim 10, wherein the IM maps a 'Location Reporting Configuration' SIP message to a 'ADD/MODIFY TRIGGER Request' LIP message, a 'TriggeringCriteria' parameter in the 'Location Reporting Configuration' SIP message to a 'Trigger type' in the 'ADD/MODIFY TRIGGER Request' LIP message, a 'Long Location Report' LIP message to a 'Location Information Report' SIP message, a 'Location data' parameter in the 'Long Location Report' LIP message to a 'CurrentCoordinate' in the 'Location Information Report' SIP message, a 'User defined data' parameter in the 'Long Location Report' LIP message to a 'TriggerId' in the 'Location Information Report' SIP message, 'Address or identification type' parameter in the 'Long Location Report' LIP message to a 'From header' in the 'Location Information Report' SIP message, a 'Long Location Report' LIP message to the 'Location Information Report' SIP message, a 'Result code' parameter in the 'Long Location Report' LIP message to a 'AnyResultcode' in the 'Location Information Report' SIP message, a 'Location Information Request' SIP Message to an 'Immediate Location Report Request', a 'Request' parameter in the 'Location Information Request' SIP Message to a 'LIP-Immediate LOCATION Report REQUEST' in the 'Immediate Location Report Request' LIP message, and a 'Basic Location Parameter Response' LIP Message to a '200 OK' SIP Message.

14. The method as claimed in claim 9, wherein the at least one trigger is at least one of a periodic trigger, a cellChange trigger, a PowerOn trigger, and an EnterService trigger on MCPTT Server side.

15. The method as claimed in claim 10, wherein the IM maps the periodic trigger to a 'maximum reporting interval trigger' on TETRA side, the cellChange trigger to a 'Change of serving cell trigger' on the TETRA side, the PowerOn trigger to a 'Subscriber unit is powered ON' trigger on the TETRA side, and the EnterService trigger to a 'Enter service trigger' on the TETRA side.

16. The method as claimed in claim 14, wherein a data flow executed by the hybrid communication network for at least one of the PowerOn trigger and the EnterService trigger comprises:

transmitting a Location Information Configuration as the first SIP message to the IM by the MCPTT server, wherein the first SIP message indicates the type of the location information required and the at least one trigger as at least one of the PowerOn trigger and the EnterService trigger;

mapping the Location Information Configuration SIP message to a Basic Location Parameter Request LIP message and transmitting to the TETRA Location Server, by the IM;

configuring a minimum reporting interval and a report type for at least one TETRA MS, in response to the Location Parameter Request LIP message received from the IM, by the TETRA Location Server;

updating own location configuration and sending a 'BASIC Location Parameter Response' acknowledgement LIP message to the TETRA Location Server, by the at least one TETRA MS;

transmitting the 'BASIC Location Parameter Response' acknowledgement LIP message received from the at least one TETRA MS to the IM, by the TETRA Location Server; and mapping the 'BASIC Location Parameter Response' acknowledgement LIP message received from the TETRA Location Server to '200 OK' SIP acknowledgement message and sending to the MCPTT server, by the IM, wherein the '200 OK' SIP acknowledgement message indicates to the MCPTT server that the Location Information Configuration has been processed by the at least one TETRA MS.

* * * * *